US007813265B2

(12) United States Patent
Patel et al.

(10) Patent No.: US 7,813,265 B2
(45) Date of Patent: Oct. 12, 2010

(54) BACKUP BGP PATHS FOR NON-MULTIPATH BGP FAST CONVERGENCE

(75) Inventors: Keyur P. Patel, San Jose, CA (US); Robert Raszuk, San Jose, CA (US); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 1250 days.

(21) Appl. No.: 11/371,522

(22) Filed: Mar. 9, 2006

(65) Prior Publication Data

US 2007/0214280 A1      Sep. 13, 2007

(51) Int. Cl.
*H04L 12/24* (2006.01)
*H04L 1/00* (2006.01)
*G06F 15/177* (2006.01)

(52) U.S. Cl. ............... 370/217; 370/221; 370/230; 370/237; 709/235; 709/238

(58) Field of Classification Search ......... 370/216–228; 709/232–235, 238–244
See application file for complete search history.

(56) References Cited

U.S. PATENT DOCUMENTS

| | | | |
|---|---|---|---|
| 6,628,649 B1 | 9/2003 | Raj et al. | |
| 6,970,464 B2* | 11/2005 | Xu et al. | 370/392 |
| 7,451,340 B2* | 11/2008 | Doshi et al. | 714/4 |
| 7,512,063 B2* | 3/2009 | Vasseur et al. | 370/217 |
| 7,584,298 B2* | 9/2009 | Klinker et al. | 709/238 |
| 7,710,872 B2* | 5/2010 | Vasseur | 370/230 |
| 2002/0131424 A1* | 9/2002 | Suemura | 370/400 |
| 2002/0167898 A1* | 11/2002 | Thang et al. | 370/216 |
| 2004/0081154 A1 | 4/2004 | Kouvelas | |
| 2006/0114818 A1* | 6/2006 | Canali et al. | 370/216 |
| 2006/0126496 A1* | 6/2006 | Filsfils et al. | 370/216 |
| 2006/0200579 A1* | 9/2006 | Vasseur et al. | 709/238 |
| 2007/0165515 A1* | 7/2007 | Vasseur | 370/216 |
| 2007/0214275 A1* | 9/2007 | Mirtorabi et al. | 709/230 |

OTHER PUBLICATIONS

Rekhter, Y., et al., RFC 1771, "A Border Gateway Protocol 4 (BGP-4)", Mar. 1995, pp. 1-54.
"Fast Scoped Rerouting for BGP", International Conference on Networks, IEEE, Sep. 2003, pp. 25-30.
Lichtwald, et al., "Fast Scoped Rerouting for BGP", ICON 2003, Institute of Telematics, University of Karlsruhe, Germany, pp. 1-15.

* cited by examiner

*Primary Examiner*—Tri H Phan
(74) *Attorney, Agent, or Firm*—Cesari and McKenna, LLP

(57) ABSTRACT

A technique institutes backup Border Gateway Protocol (BGP) paths for non-multipath BGP Fast Convergence in a computer network. According to the novel technique, a protecting node, e.g., a border router, calculates a best BGP path to a destination prefix, and also calculates one or more backup BGP paths (i.e., non-multipath paths) to the destination prefix. The best path is selected as a utilized path for the destination prefix, e.g., the path over which to send traffic destined for the prefix from the border router. Upon determining that the best BGP path has failed, one of the backup BGP paths is selected as the utilized path for the destination prefix.

26 Claims, 8 Drawing Sheets

BGP SERVICES 249

BGP TABLE 300

| STATUS CODES 305 | DESTINATION PREFIX (NETWORK) 310 | NEXT-HOP ADDRESS 315 | METRIC/LOCPREF/ WEIGHT VALUES 320 | AS PATH 325 | ORIGIN CODE 330 |
|---|---|---|---|---|---|
| | | | ENTRY 350 | | |
| * b | P1 | BGP NODE 1 | X | AS1, AS2, AS3 | e |
| * > | P1 | BGP NODE 2 | Y | AS1, AS2, AS3 | e |
| * | P1 | BORDER ROUTER B | Z | AS1, AS4, AS5, AS3 | i |

BACKUP BGP PATHS FOR NON-MULTIPATH BGP FAST CONVERGENCE

BACKGROUND OF THE INVENTION

1. Field of the Invention

The present invention relates to computer networks and more particularly to Fast Convergence for non-multipath Border Gateway Protocol (BGP) paths in a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS is generally referred to as a "domain," and a router that interconnects different domains is generally referred to as a "border router."

An example of an interdomain routing protocol is the Border Gateway Protocol version 4 (BGP), which performs routing between domains (ASes) by exchanging routing and reachability information among neighboring interdomain routers of the systems. An adjacency is a relationship formed between selected neighboring (peer) routers for the purpose of exchanging routing information messages and abstracting the network topology. The routing information exchanged by BGP peer routers (BGP speakers or BGP nodes) typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. The BGP protocol is well known and generally described in Request for Comments (RFC) 1771, entitled *A Border Gateway Protocol 4* (BGP-4), published March 1995, the contents of which are hereby incorporated in its entirety.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

To ensure that its routing table contains up-to-date inter-domain routing information, the intermediate network node may cooperate with other intermediate nodes to disseminate routing information representative of the current network topology. Typically, routing information is disseminated among interconnected intermediate network BGP nodes through advertising BGP update messages, or "BGP advertisements." As used herein, a BGP advertisement generally describes any message used by a BGP routing protocol for communicating routing information among interconnected BGP nodes, i.e., routers and switches. Operationally, a remote BGP node (e.g., of a remote domain) may establish a BGP session with a local BGP node (e.g., of a local domain), and transmit a generated BGP advertisement to the local BGP node. Thereafter, the local BGP node may receive the transmitted BGP advertisement and update its routing table based on routing information contained in the received BGP advertisement. Note that a BGP session between local and remote domains (interdomain) is an external BGP (eBGP) session. The local BGP node may then transmit the received BGP advertisement to other BGP nodes of the local domain until each interconnected BGP node of the local domain has received the BGP advertisement and updated its local routing table. Note further that a BGP session within a domain (intradomain) is an internal BGP (iBGP) session. BGP nodes within a domain, such as an AS, are typically connected via a fully meshed iBGP session arrangement to ensure that all BGP nodes receive advertisements from the other BGP nodes in the AS. Note still further that eBGP and iBGP are generally referred to herein as "BGP." Moreover, a BGP session may be a multi-hop BGP session, such as where there are intermediate nodes/devices between the edge devices.

BGP route selection, as described herein, may utilize a distance vector (Bellman-Ford) algorithm or, more specifically, a BGP best path selection (path vector) algorithm, or a "best BGP path selection algorithm". According to the BGP standard, every BGP router announces to all of its peers the routes it uses for its own forwarding. As a result of these announcements (i.e., BGP advertisements), a particular router may gather from its peers two or more routes for some networks. For example, the router may have learned two or more different ways to reach a particular destination prefix, and the best BGP path selection computation is a way of choosing one of those routes as "best" and using it to render forwarding decisions for the router (i.e., the best route is installed into the routing table).

Multipath BGP allows installation of multiple BGP paths for the same destination prefix into the routing table. These multiple BGP paths may be installed into the routing table along with the best BGP path to enable load sharing/balancing, as will be understood by those skilled in the art. In order to be candidates for multipath BGP selection, paths to the same destination prefix may be required to share a number of characteristics equal to the best BGP path, e.g., weight, local preference, AS-Path length, Origin, MED, etc., as will be also be understood by those skilled in the art. Note that in the case of multipath BGP, these multiple chosen paths are only installed into the local routing table, and only the best BGP path for each prefix may be advertised to BGP peers. Commonly, multipath BGP must be configured on the BGP node in order to be operational.

Occasionally, a network element (e.g., a node or link) fails, causing redirection of the traffic that originally traversed the failed network element to other network elements that bypass the failure. Generally, notice of this failure is relayed to the surrounding nodes in the network through one or more advertisements of the new network topology, e.g., IGP and/or BGP advertisements, and routing tables are updated to avoid the failure accordingly. Reconfiguring a network in response to a network element failure using, e.g., pure IP rerouting, can be time consuming. In the case of BGP paths, in particular, the network element failure may cause a failure of the best BGP path currently installed in the routing table of a particular BGP node (e.g., a border router). In this case, a substantial amount of BGP calculation must be performed for each reachable destination prefix previously utilizing the failed best BGP path in order to converge the routing table to the current network topology. The propagation/installation of the BGP information into the routing tables may also cause lengthy delay. These computations and delays may result in lost traffic or other adverse network conditions, as those skilled in the art will understand.

Many recovery techniques, however, are available to provide fast recovery and/or network configuration in the event of a network element failure, including, inter alia, Fast Reroute (FRR). FRR has may be deployed to protect against network element failures, where "backup tunnels" are created and set up a priori (before the occurrence of the failure) to bypass a protected network element (e.g., links, shared risk link groups (SRLGs), and nodes). When the network element fails, traffic is quickly rerouted over a backup tunnel to bypass the failed element. An example protocol that may advantageously use backup tunnels is the Multiprotocol Label Switching (MPLS) protocol, as will be understood by those skilled in the art.

Aside from backup tunnels (e.g., for networks not configured with tunneling protocols), various approaches have been suggested for reducing the BGP convergence time in case of failures. For instance, reducing the number of BGP messages exchanged after a failure may reduce the convergence time. An additional proposed technique is described in "Fast Scoped Rerouting for BGP," International Conference on Networks, pages 25-30, IEEE, September 2003, which requires BGP routers to find an alternate path for a destination after a failure as a result of which recovery time is still long. Multipath BGP, however, allows for multiple BGP paths to be inserted into the routing table. In this instance, should one of the multipath BGP paths fail, other multipath BGP paths may be available to reach the destination prefix. As mentioned, however, multipath BGP paths may only exist when the multiple paths are equal in (share) a number of characteristic categories, and only on BGP nodes configured for multipath BGP.

There remains a need, therefore, for a technique that provides FRR (or "Fast Convergence") to BGP paths in a computer network that substantially eliminates per-prefix convergence delay (e.g., BGP computation and/or routing table information propagation), without the use of backup tunnels or multipath BGP.

SUMMARY OF THE INVENTION

The present invention is directed to a technique for instituting backup Border Gateway Protocol (BGP) paths for non-multipath BGP Fast Convergence in a computer network. According to the novel technique, a protecting node, e.g., a border router, calculates a best BGP path to a destination prefix, and also calculates one or more backup BGP paths (i.e., non-multipath paths) to the destination prefix. The best path is selected as a utilized path for the destination prefix, e.g., the path over which to send traffic destined for the prefix from the border router. Upon determining that the best BGP path has failed, one of the backup BGP paths is selected as the utilized path for the destination prefix.

In accordance with one aspect of the present invention, an illustrative BGP path selection algorithm calculates a best BGP path to the destination prefix from a plurality of available BGP paths using a conventional technique known to those skilled in the art (e.g., a best BGP path selection algorithm). Once the best BGP path is calculated, the selection algorithm removes the best BGP path from the plurality of available BGP paths to the destination prefix, and recalculates the next-best BGP path accordingly. The next-best BGP path may then be designated and stored as a backup BGP path for the destination prefix. This process may be repeated (i.e., removing the best/next-best BGP paths) to calculate a configurable number of backup BGP paths, or until no other BGP path exists to the destination prefix.

In accordance with another aspect of the present invention, the illustrative BGP path selection algorithm is extended to assign a number to each step of the algorithm (e.g., an ordered/prioritized set of comparison rules). Here, the selection algorithm compares two BGP paths to the destination prefix, and calculates the best BGP path of the two, e.g., based on progressive steps/rules. The BGP path that is not the best BGP path may thus be designated as the backup BGP path and according to this aspect of the invention, the assigned number corresponding to the step at which the distinction was made may be stored. The best BGP path may then be compared with a next available BGP path to the destination prefix. In the event the best BGP path is no longer the best, it may be designated and stored as the backup path, and the next BGP path may be designated as the new best BGP path. If, on the other hand, the best BGP path remains the same best BGP path after the comparison, the step at which the distinction was made for the next BGP path is compared with the stored step number (i.e., at which the backup BGP path was determined). If the next BGP path step number is greater than (i.e., progressed through more steps than) the stored number (i.e., of the backup BGP path), then the next BGP path is selected as the backup BGP path. Otherwise, no action is taken with regard to the backup BGP path. The comparison may be repeated until no next available BGP paths exist.

In accordance with yet another aspect of the present invention, the best and backup BGP paths may be stored in a routing table of the protecting node, e.g., with an indication signifying the backup BGP path(s) (i.e., as non-multipath BGP paths). Once failure of the best BGP path is determined, i.e., the destination prefix is no longer reachable via the best BGP path, the protecting node selects one of the backup BGP paths to transmit traffic to that prefix. Notably, best and backup BGP paths may be calculated and stored for all destination prefixes or a predetermined (e.g., dynamically) subset of protected destination prefixes.

Advantageously, the novel technique institutes backup BGP paths for non-multipath BGP Fast Convergence in a computer network. By creating backup BGP paths, the novel technique allows for faster BGP convergence in response to best BGP path failure in non-multipath BGP networks. In particular, less traffic may be impacted (e.g., lost) due to a BGP path failure, where connectivity protection scales with regard to a number of diverse backup BGP paths. Also, the dynamic nature of the novel technique alleviates the need for cumbersome manual configuration.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 3 is schematic block diagram of an exemplary BGP table that may be advantageously used with the present invention;

DETAILED DESCRIPTION OF AN
ILLUSTRATIVE EMBODIMENT

Figure 1:
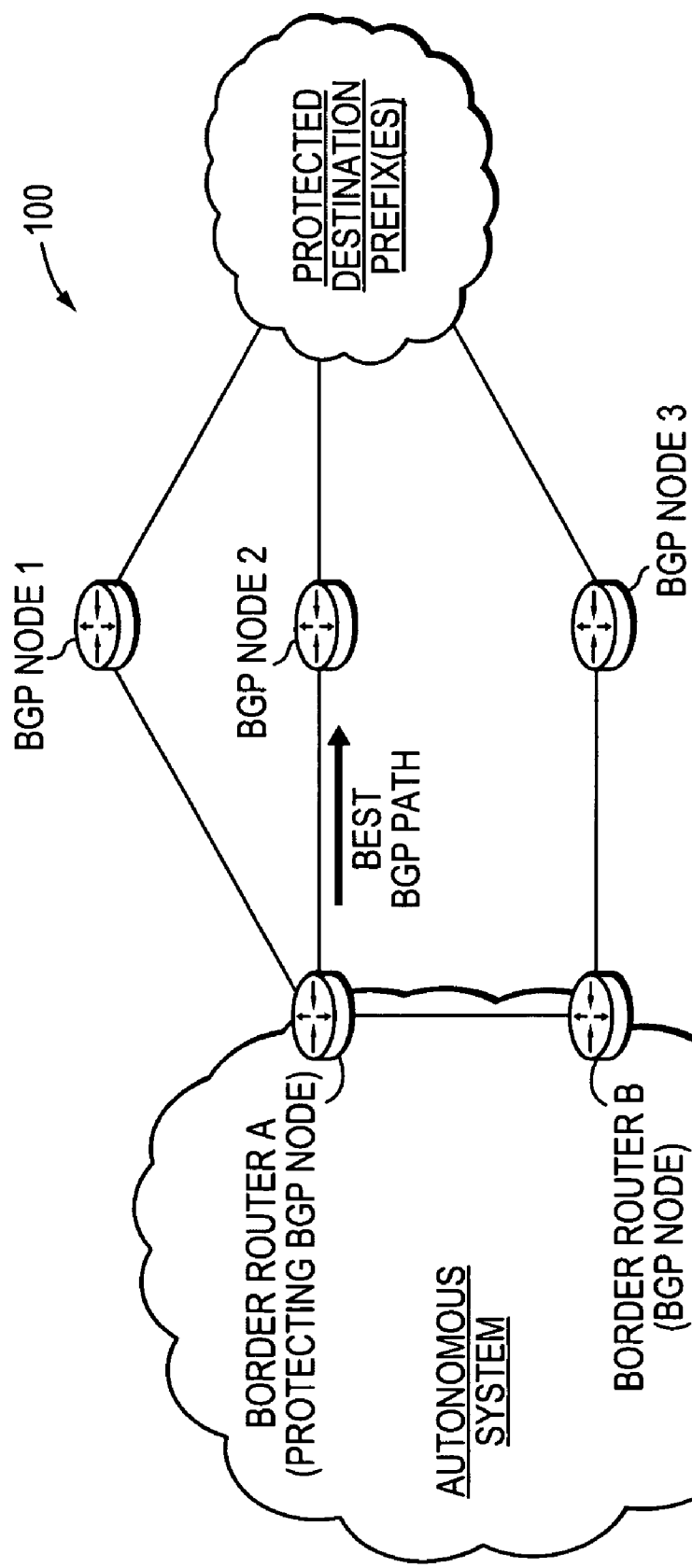
FIG. 1 is a schematic block diagram of an exemplary computer network that may be used in accordance with the present invention.

FIG. 1 is a schematic block diagram of an exemplary computer network 100 comprising border routers A and B of an autonomous system (e.g., a customer or provider network) interconnected to a plurality of BGP nodes 1-3 over links as shown. Those skilled in the art will understand that the BGP nodes may be configured as border routers within one or more other autonomous systems (not shown), and that the view shown herein is for simplicity. Notably, border routers A and B may also be configured as BGP nodes in accordance with the present invention described herein. Also, in the case of customer/provider networks, the border routers and BGP nodes may be configured as customer edge (CE) devices and/or provider edge (PE) devices. Illustratively, each of the BGP nodes 1-3 may be interconnected to one or more reachable destination prefixes (networks), such as through a Wide Area Network (WAN) or other networks, as will be understood by those skilled in the art. These examples are merely representative. Those skilled in the art will understand that any number of routers, nodes, links, networks, etc., may be used in the computer network 100 interconnected in any manner, and that the view shown herein is for simplicity.

Data packets may be exchanged among the networks (e.g., autonomous systems) using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers within an autonomous system using predetermined "interior" gateway protocols (IGPs), such as conventional distance-vector protocols or, illustratively, link-state protocols, through the use of link-state advertisements or link-state packets. In addition, data packets containing network routing information may be exchanged among the autonomous systems (i.e., between BGP nodes) using "external" gateway protocols, such as the Border Gateway Protocol (BGP).

Figure 2:
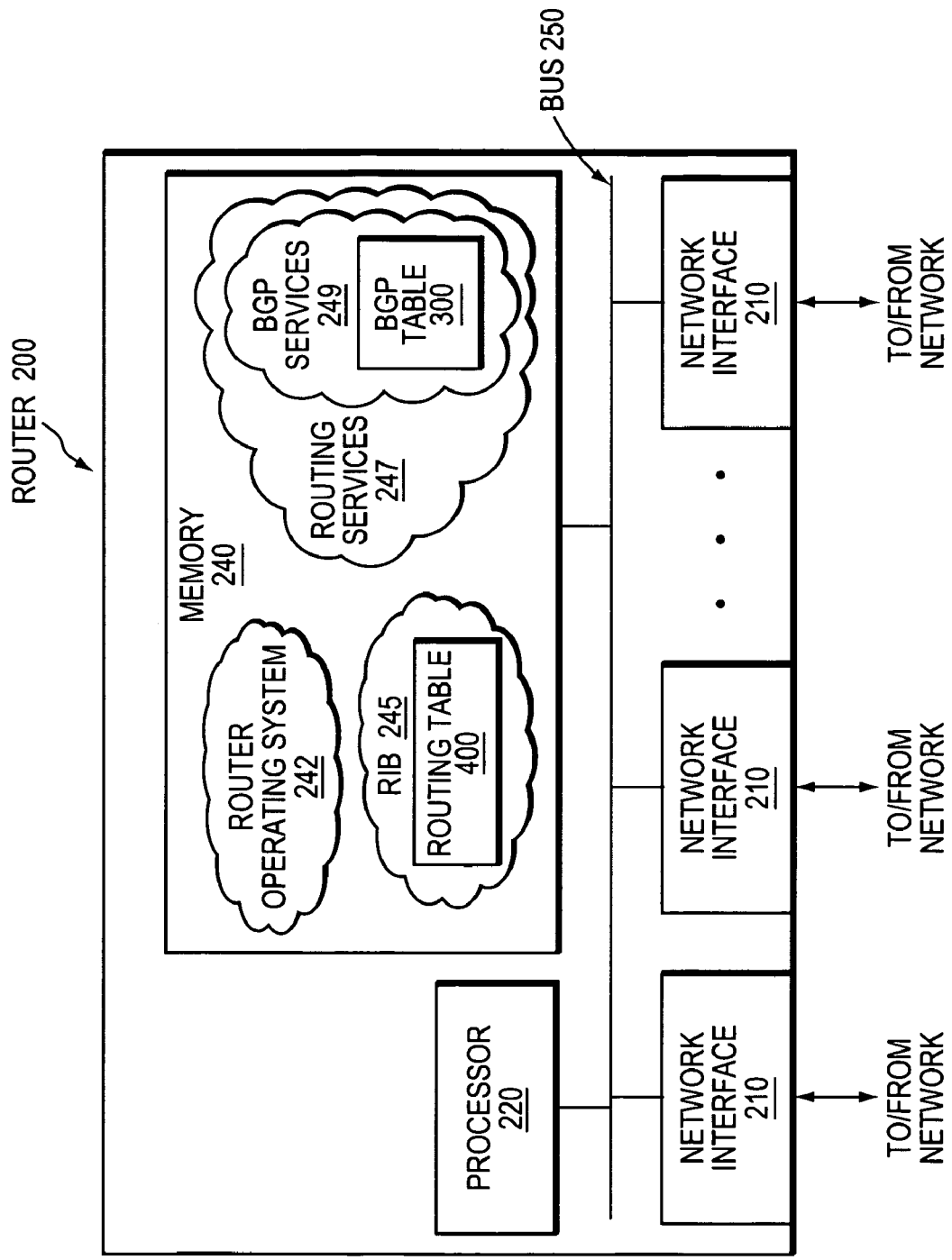
FIG. 2 is schematic block diagram of an exemplary router that may be advantageously used with the present invention.

FIG. 2 is a schematic block diagram of an exemplary router 200 that may be advantageously used with the present invention, e.g., as a BGP node. The router comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as BGP table 300 and routing table 400. A router operating system 242 (e.g., the Internetworking Operating System, or IOS™, of Cisco Systems, Inc.), portions of which is typically resident in memory 240 and executed by the processor, functionally organizes the router by, inter alia, invoking network operations in support of software processes and/or services executing on the router. These software processes and/or services may comprise Router Information Base (RIB) 245, routing services 247, and BGP services 249. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP (e.g., OSPF and IS-IS), IP, BGP (e.g., as BGP services 249), etc. These functions may be configured to manage a forwarding information database (not shown) containing, e.g., data used to make forwarding decisions. Routing services 247 may also perform functions related to virtual routing protocols, such as maintaining VRF instances (not shown) as will be understood by those skilled in the art.

BGP services (or process) 249 may be used during communication of network reachability information among devices 200 between the domains, such as through the transmission and analysis of BGP advertisements. Suppose, for example, that a new address prefix is established within an autonomous system or a new connection is created between two or more autonomous systems (e.g., between a provider network and one or more customer networks). Once the change in the network's state is detected by one of the BGP enabled devices, that device may transmit a BGP advertisement communicating the change to the other autonomous systems. BGP services 249 of other network nodes receive the advertisements, update their internal routing/reachability information, and may continue to transmit BGP advertisements with the new information as understood by those skilled in the art.

Network reachability information obtained from the BGP advertisements may be illustratively stored in a BGP table, e.g., at a BGP node. FIG. 3 is schematic block diagram of exemplary BGP table 300 that may be advantageously used with the present invention. BGP table 300 is illustratively stored in memory 240 and includes one or more entries 350, each comprising a plurality of fields for storing a status code 305 of one or more reachable destination address prefixes (networks) 310, a next-hop address 315 to reach that destination, one or more Metric/LocPref/Weight Values 320 associated with is reaching the destination from the next-hop address, an AS Path 325, and an origin code 330. The BGP table 300 is illustratively maintained and managed by BGP services 249. To that end, the BGP services 249 maintains copies of routes (paths) provided by the BGP advertisements within the BGP table 300 in order to compute best BGP paths/routes for installation into the routing table 400 (below).

For example, assume that destination prefix P1 is reachable from border router A via BGP node 1, BGP node 2, and border router B. Destination prefix fields 310 of entries 350a-c contain the reachable address prefix P1, and the next-hop fields 315 are populated with corresponding addresses (e.g., loopback addresses) of BGP node 1, BGP node 2, and border router B, respectively. Note that a loopback address of the next-hop nodes may be used as the next-hop address for many reasons, including as a way to avoid depending upon the availability of network interfaces of that node. The Metric, Local Preference (LocPref) and/or Weight values associated with reaching P1 from each of the next-hop nodes is denoted as "X," "Y," and "Z," respectively, as those skilled in the art will understand. AS Path field 325 may be populated with identifications of the autonomous systems that are traversed along the corresponding BGP path to reach the destination prefix. For instance, assume that border router A is in an autonomous system "AS1," and that destination prefix P1 is in an autonomous system "AS3." The AS Paths including autonomous systems between AS1 and AS3 along a particular BGP path (e.g., AS2 for paths through BGP nodes 1 and 2, or AS4 and AS5 for paths through border router B) may be denoted as, e.g., "AS1, AS2, AS3" or "AS1, AS4, AS5, AS3," respectively. Origin Code 330 indicates from where the BGP path was learned, e.g., "i" for internally learned paths (e.g., IGP), "e" for externally learned paths (e.g., BGP), and "?" for incomplete paths.

Status codes 305 may be used by the BGP services 249 of a BGP node 200 to determine the particular status of a corresponding BGP path/route entry 350. For example, as those skilled in the art will understand, various status codes that may be used may comprise, e.g., "s" for suppressed routes, "d" for damped routes, "h" for history routes, "*" for valid routes, ">" for best routes, "i" for internal routes, "r" for RIB-failure routes, and "S" for state routes. Illustratively, a novel status code for backup routes (e.g., "b") may also be included in accordance with the present invention as described in more detail below.

Once the BGP table 300 is populated with a plurality of BGP paths to destination prefixes, a "best" BGP path may be selected for installation into the routing table 400 (below). BGP route selection may utilize a distance vector (Bellman-Ford) algorithm or, more specifically, a best BGP path selection (path vector) algorithm. Broadly stated, the illustrative best BGP path selection algorithm may comprise the following steps:

1. Prefer the path with the largest WEIGHT; note that WEIGHT is a locally specified parameter, i.e., local to the router on which it is configured;
2. Prefer the path with the largest LOCAL_PREF;
3. Prefer the path that was locally originated via a network or aggregate BGP subcommand, or through redistribution from an interior gateway protocol (IGP);
4. Prefer the path with the shortest AS_PATH;
5. Prefer the path with the lowest origin type, e.g., IGP is lower than exterior gateway protocol (EGP), and EGP is lower than INCOMPLETE;
6. Prefer the path with the lowest MED among routes with identical AS;
7. Prefer external (eBGP) over internal (iBGP) paths;
8. Prefer the path with the lowest IGP metric to the BGP next hop;
9. Prefer the route coming from the BGP router with the lowest router ID (BGP identifier);
10. If the originator or router ID is the same for multiple paths, prefer the path with the minimum cluster ID length; and
11. Prefer the path coming from the lowest neighbor (peer) address.

Those skilled in the art will understand that the above steps for the best BGP path selection algorithm are merely representative examples. Other steps may be added, and/or some of the above steps may be removed, and the order of the steps shown may be rearranged. Notably, those skilled in the art will appreciate that any best BGP path selection algorithm may be used in accordance with the present invention described herein.

Figure 4:
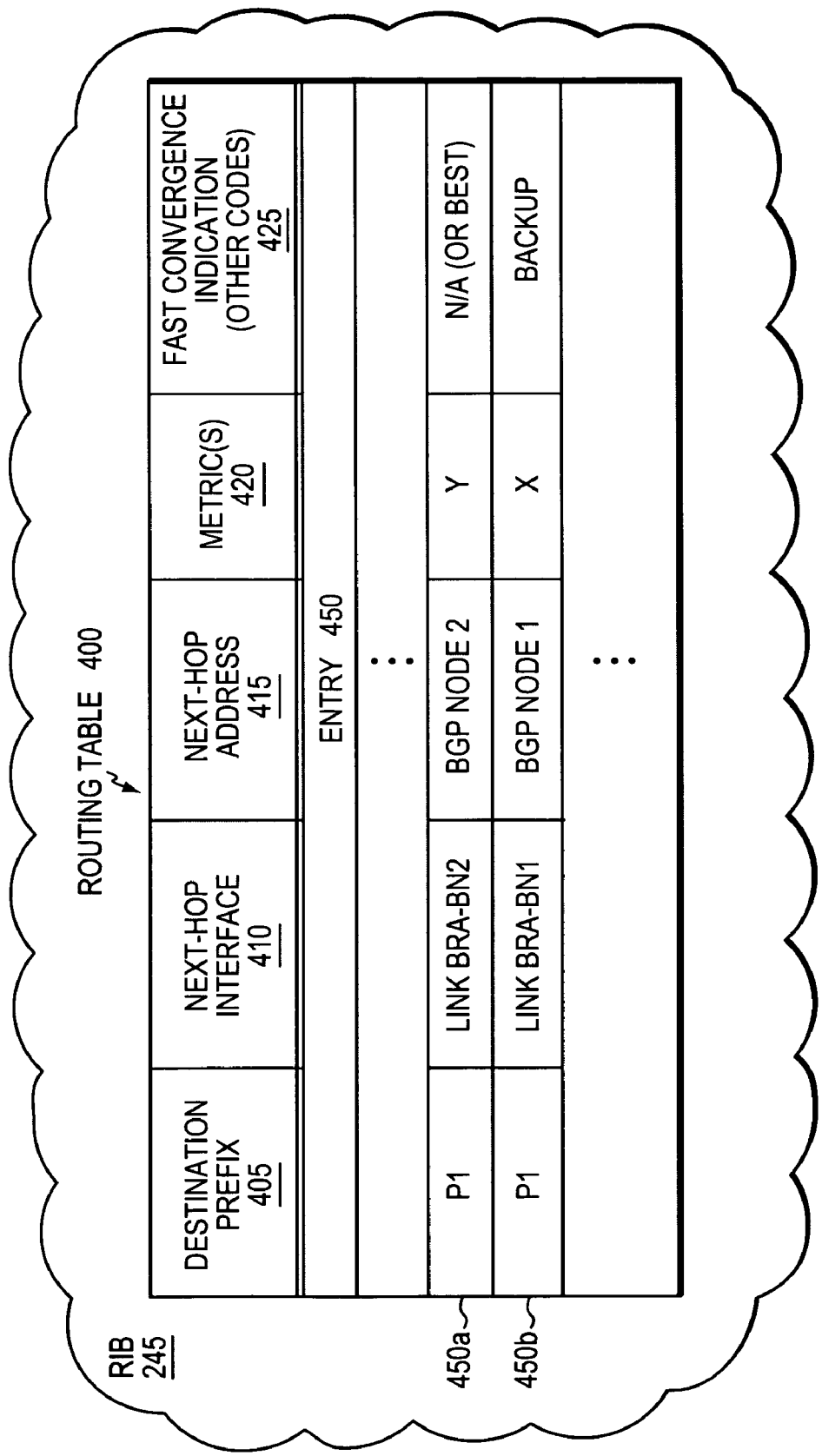
FIG. 4 is schematic block diagram of an exemplary routing table that may be advantageously used with the present invention.

Once a best BGP path is calculated (selected), the appropriate status code 305 may be inserted in the corresponding entry 350 of BGP table 300 (e.g., the ">" of entry 350b). These best BGP paths for the destination prefixes may then be propagated to the RIB 245 for installation (insertion) into a routing table used to forward traffic received at the node for the destination prefixes. FIG. 4 is schematic block diagram of exemplary routing table 400 that may be advantageously used with the present invention. Routing table 400 is illustratively stored in memory 240 and includes one or more entries 450, each comprising a plurality of fields for storing a reachable destination address 405, a next-hop interface 410 and next-hop address 415 to reach that destination, and an associated metric (e.g., cost) 420 of reaching the destination. The routing table 400 is illustratively maintained and managed by RIB 245. To that end, the RIB 245 maintains copies of routes (paths) provided by the routing protocols, such as BGP, in order to compute best paths/routes (e.g., at the routing layer, as will be understood by those skilled in the art) for installation into the routing table 400.

For example, assume that the best BGP path for destination address prefix P1 is inserted into the routing table 400. A destination prefix field 405 of entry 450a contains the reachable address prefix P1, and the next-hop fields 410, 415, are populated with, e.g., link BRA-BN2 (i.e., the link between border router A and BGP node 2) and a loop-back address of BGP node 2, respectively. The metric or cost to reach P1 may be the cost as learned from the BGP table 300. A novel Fast Convergence indication (or other codes) field 425 may also be included with each entry 450 in accordance with the present invention, as described in detail below. Notably, in the case of multipath BGP, multiple best BGP paths may be entered into the routing table 400 as will be understood by those skilled in the art, such as, e.g., including an indication (not shown) of the multipath status in the other codes field 425.

The present invention is directed to a technique for instituting backup BGP paths for non-multipath BGP Fast Convergence in a computer network. According to the novel technique, a protecting node, e.g., a border router, calculates a best BGP path to a destination prefix, and also calculates one or more backup BGP paths (i.e., non-multipath paths) to the destination prefix. The best path is selected as a utilized path for the destination prefix, e.g., the path over which to send traffic destined for the prefix from the border router. Upon determining that the best BGP path has failed, one of the backup BGP paths is selected as the utilized path for the destination prefix.

In accordance with one aspect of the present invention, an illustrative BGP path selection algorithm calculates a best BGP path to the destination prefix from a plurality of available BGP paths using a conventional technique known to those skilled in the art (e.g., the best BGP path selection algorithm above). For example, with reference to FIG. 3, assume that the BGP path to destination prefix P1 via BGP node 2 (entry 350*b*) is calculated to be the best BGP path (denoted with a ">" in status code field 305). Once the best BGP path is calculated, the selection algorithm removes the best BGP path from the plurality of available BGP paths to the destination prefix (e.g., the BGP node "de-links"the best BGP path from the available choices), and recalculates the next-best BGP path accordingly. The next-best BGP path may then be designated and stored as a backup BGP path for the destination prefix. Illustratively, further assume that the BGP path to destination prefix P1 via BGP node 1 (entry 350*a*) is calculated to be the next-best BGP path (i.e., the best BGP path of the remaining available BGP paths to the destination prefix). The BGP path via BGP node 1, then, may be designated and stored as a backup BGP path for P1 (denoted with an illustrative "b" in status code field 305).

This process may be repeated (i.e., removing the best/next-best BGP paths) to calculate a configurable number of backup BGP paths (e.g., one, two, etc.), or until no other BGP path exists to the destination prefix. For instance, after removing the next-best BGP path (i.e., the backup BGP path) from the remaining available BGP paths, the next-best (e.g., the next-next-best) BGP path may then be calculated as the path via border router B (entry 350*c*), which may then be designated and stored as an additional backup BGP path. If other available BGP paths still remain, the process may repeat for other additional backup BGP paths. If there are no other entries for the destination prefix P1 in the BGP table 300, however, then no other backup BGP paths may be calculated. In the event that there are multiple backup BGP paths, these additional backup paths may be identified within the BGP table 300 by illustrative "b1," "b2," etc., or other signifying notations in status code fields 305.

Notably, the backup BGP paths may be required to be diverse from either the best BGP paths or other additional backup BGP paths. For example, the backup BGP paths may be link diverse (no two sharing the same link), node diverse (no two sharing the same node, or BGP next-hop node diverse), shared risk link group (SRLG) diverse, etc., each as will be understood by those skilled in the art. Also as will be understood, by maintaining diverse backup BGP paths, it is less likely that a backup BGP path will fail at the same time as a best BGP path.

In accordance with another aspect of the present invention, the illustrative BGP path selection algorithm is extended to assign a number to each step of the algorithm (e.g., an ordered/prioritized set of comparison rules). For example, each step 1-11 of the illustrative best BGP path selection algorithm above may be assigned the respective number (i.e., 1-11); i.e., the higher the number, the further the algorithm progressed prior to making a determination/distinction. The selection algorithm compares two BGP paths to the destination prefix, and calculates the best BGP path of the two, e.g., based on the progressive steps/rules. The BGP path that is not the best BGP path may thus be designated as the backup BGP path and according to this aspect of the present invention, the assigned number corresponding to the step at which the distinction was made may be stored. For example, assume that BGP paths 350*a* and 350*b* are compared first, and that BGP path 350*b* (i.e., via BGP node 2) is a better path to the destination prefix, P1. BGP path 350*a* (i.e., via BGP node 1), then, may be designated and stored as a backup BGP path. Illustratively, further assume that the distinction was made at step 8 of the best BGP path selection algorithm; that is, preferring the path with the lowest IGP metric to the BGP next hop, e.g., where the IGP cost to reach BGP node 2 from the border router A is less than that to reach BGP node 1. In this case, the assigned number "8" may be stored.

The best BGP path may then be compared with a next available BGP path to the destination prefix. For example, best BGP path 350*b* may be compared with next available BGP path 350*c* (i.e., via border router B). In the event the best BGP path is no longer the best, it may then be designated and stored as the backup path, and the next BGP path may be designated as the new best BGP path. If, on the other hand, the best BGP path remains the same best BGP path after the comparison, the step at which the distinction was made for the next BGP path is compared with the stored step number (i.e., at which the backup BGP path was determined). Illustratively, assume that BGP path 350*c* "lost" to the best BGP path at step 4 of the best BGP path selection algorithm; i.e., preferring the path with the shortest AS_PATH, e.g., where BGP path 350*b* has three AS values, while BGP path 350*c* has four. If the next BGP path step number is greater than (i.e., progressed through more steps than) the stored number (i.e., of the backup BGP path), then the next BGP path is selected as the backup BGP path. Otherwise, no action is taken with regard to the backup BGP path.

In the example used herein, the original backup BGP path 350*a* progressed through eight steps (i.e., to step 8) prior to the distinction being made, while the next available BGP path only progressed through four steps (i.e., to step 4). Therefore, the original backup BGP path remains, since it is more closely equal to the best BGP path, as will be understood by those skilled in the art. (Notably, had path 350*c* been compared with 350*b* first, the next available path 350*a* would have had a higher corresponding assigned step number, and thus would have replaced 350*c* as a backup BGP path.)

The comparison of the best BGP path with next available BGP paths may be repeated until no next available BGP paths exist, e.g., comparing BGP paths for each path chain in the path list. Notably, the above description may be extended to calculate and store additional backup paths with simple modifications. For example, an additional layer of backup BGP path comparison may be added to determine the second backup BGP path, third backup, etc., as will be understood by those skilled in the art. Moreover, the comparison of assigned step numbers is merely one example technique for examining the comparison progress within the selection algorithm. Other means for determining which BGP path is more closely equal to the best BGP path may be used in accordance with the present invention, such as, e.g., comparing the two backup candidate BGP paths.

Those skilled in the art will understand that the extended best and backup BGP path selection algorithm may offer the benefit of only traversing (comparing) the list of available BGP paths once, as opposed to each time an additional backup BGP path is required as described above. (Those skilled in the art will understand the either procedure may result in the same best and backup BGP paths, accordingly.) Other best and backup BGP path selection algorithms may be used in accordance with the present invention, and the illustrative/extended algorithms described herein are merely two possible solutions.

In accordance with yet another aspect of the present invention, the best and backup BGP paths may be stored in routing table 400 of the protecting node (border router A), e.g., with an indication signifying the backup BGP path(s) (i.e., as non-multipath BGP paths). For instance, referring to FIG. 4, in addition to the best BGP path entry 450a described above, an additional backup BGP path entry 450b may be inserted into the routing table 400 as shown. Those skilled in the art will appreciate that the backup BGP paths may be asynchronously inserted into the routing table 400 from the best BGP paths.

For example, in the event the backup BGP path is calculated as the path from border router A via BGP node 1, corresponding fields (next-hop, metric, etc.) may be populated accordingly. Notably, the novel Fast Convergence indication field 425 includes an indication designating the entry 450b as a backup BGP path (e.g., "backup"). As a result of the designation, the router 200 is configured not to utilize the backup BGP path to forward traffic while the best BGP path is operational. Multiple backup BGP paths (not shown) may have designations of their backup preferences, e.g., "backup 1," "backup 2," etc., or other configured indication. Moreover, best BGP paths (e.g., entry 450a) may or may not have designations of their status (e.g., best, primary, utilized, etc.) to distinguish the best BGP paths from backup BGP paths. In this manner, the present invention supports multiple BGP entries with a single best BGP path without requiring the BGP node to utilize multipath BGP. According to the present invention, then, the backup BGP paths may be stored in the routing table (e.g., the routing layer) for pre-failure resolution.

Figure 5:
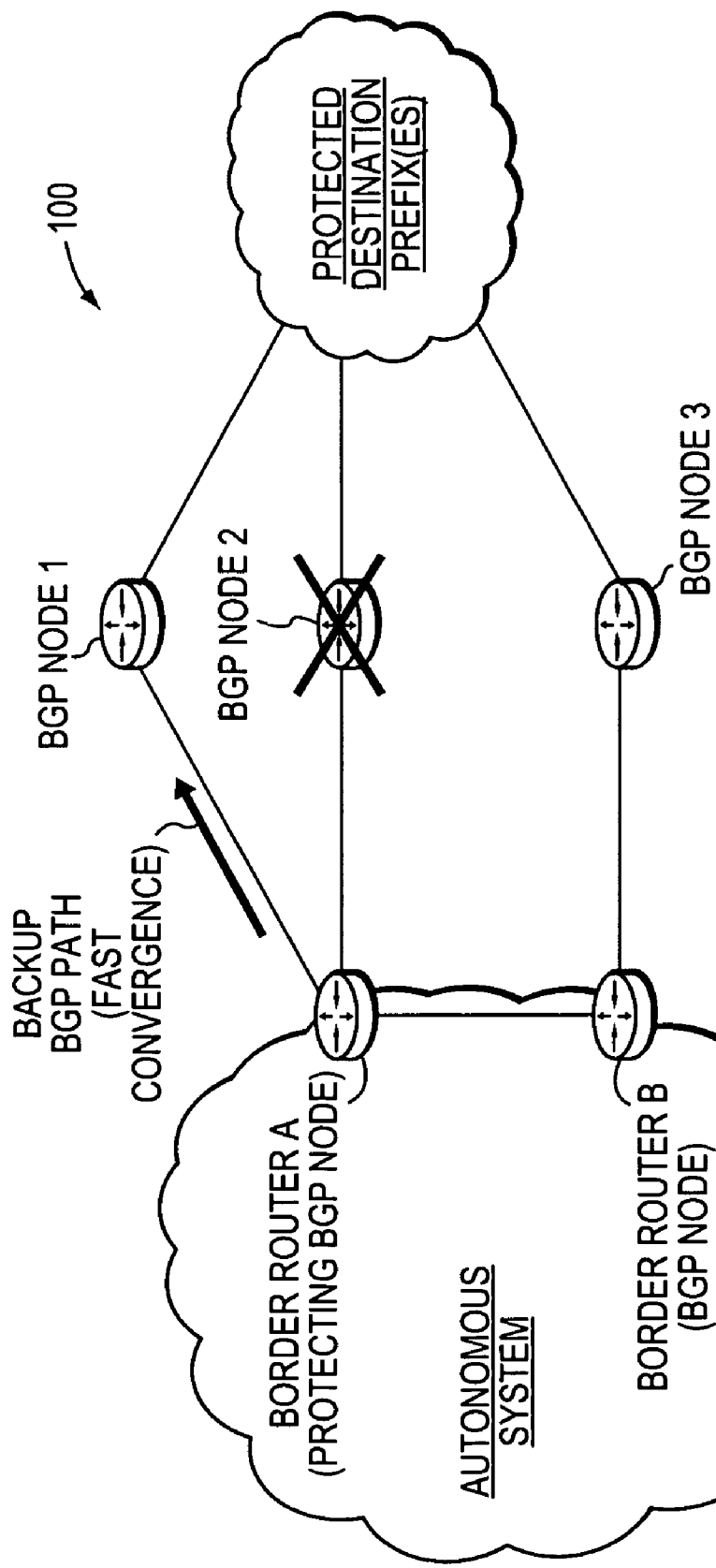
FIG. 5 is a schematic block diagram of the computer network in FIG. 1 showing protection of a best BGP path using BGP Fast Convergence in accordance with the present invention.

FIG. 5 is a schematic block diagram of the computer network in FIG. 1 showing protection of a best BGP path using BGP Fast Convergence in accordance with the present invention. The protecting BGP node (border router A) monitors the connectivity of the best BGP path to detect a failure. Failure of the best BGP path may be determined using a known connectivity verification protocol, such as, e.g., Bidirectional Forwarding Detection (BFD), IGP detection, BGP session KEEPALIVE message exchanges, etc., as will be understood by those skilled in the art. Once failure of the best BGP path is determined, i.e., the destination prefix is no longer reachable via the best BGP path (as denoted by the "X" overlaid on BGP node 2), the protecting node selects one of the backup BGP paths to transmit traffic to that prefix (i.e., prior to BGP convergence). For instance, in the case where only a single backup BGP path exists (e.g., via BGP node 1), that backup BGP path is selected. Where multiple backup BGP paths exist, however, a first preferred backup path (e.g., "backup 1") may be selected, or other techniques (e.g., random selection of equally preferred backup paths, etc.) may be used to select one of the multiple backup BGP paths. In the event a selected backup BGP path has also failed (e.g., due to non-diverse backup BGP paths), other available backup BGP paths may be selected accordingly. By quickly selecting the backup BGP path in response to failure of the best BGP path, those skilled in the art will appreciate that the present invention allows for fast response time with substantially no associated convergence (e.g., recalculation and propagation) delay, effectively creating Fast Convergence (e.g., "FRR") for non-multipath BGP.

Notably, best and backup BGP paths may be calculated and stored for all destination prefixes or a predetermined (e.g., dynamically) subset of protected destination prefixes. For instance, a system administrator may configure BGP Fast Convergence protection for "important" destination prefixes, such as a large enterprise network, voice over IP (VoIP) network gateways, etc., as will be understood by those skilled in the art. Alternatively, various traffic monitoring techniques may allow for the protecting BGP node to dynamically determine to which destination prefixes a majority of the traffic is destined. Accordingly, backup BGP paths may be calculated and maintained for those corresponding destination prefixes.

Figure 6:
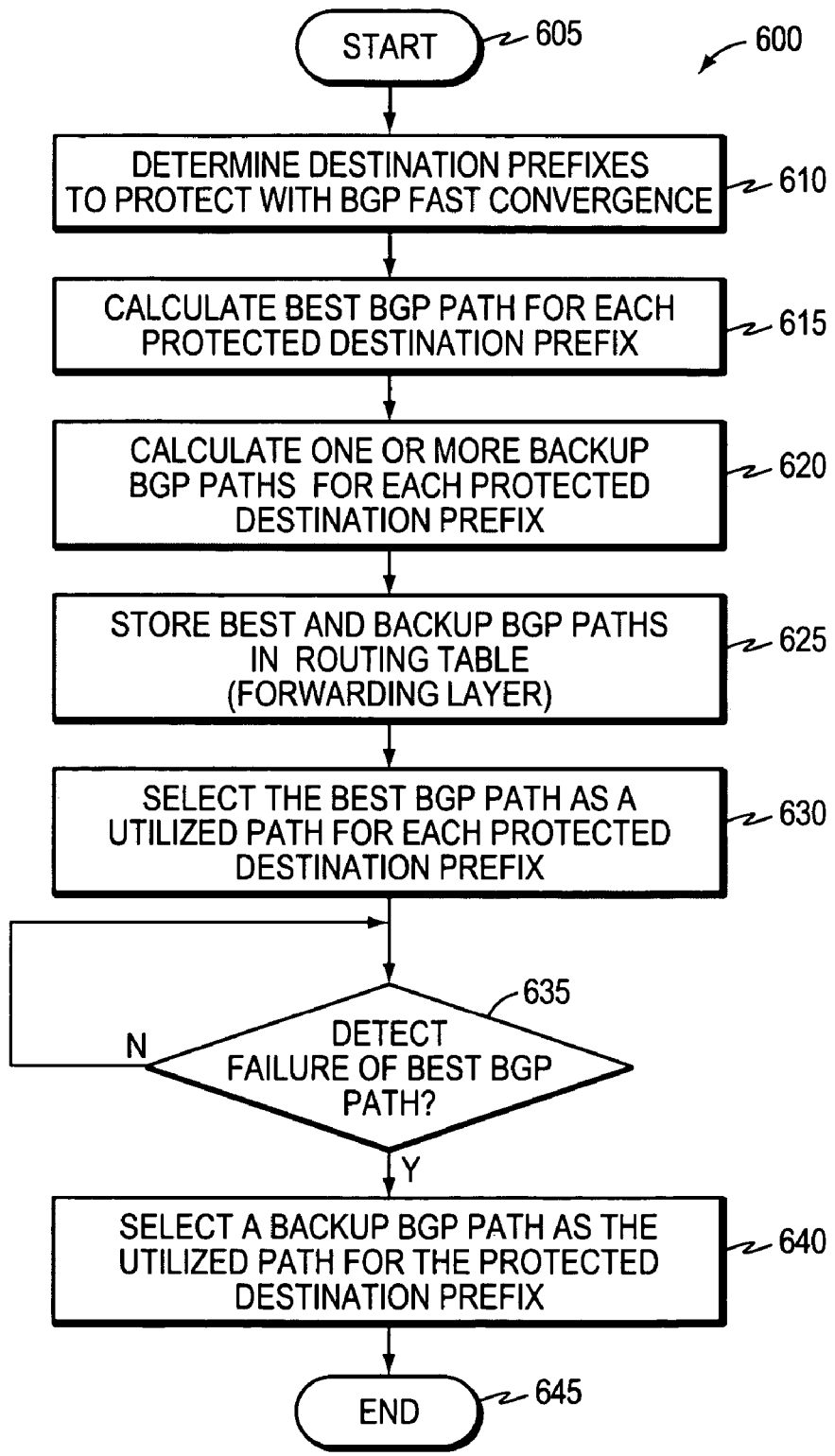
FIG. 6 is a flowchart illustrating a procedure for instituting backup BGP paths for non-multipath BGP Fast Convergence in accordance with the present invention.

FIG. 6 is a flowchart illustrating a procedure for instituting backup BGP paths for non-multipath BGP Fast Convergence in accordance with the present invention. The procedure 600 starts at step 605, and continues to step 610, where the BGP node (e.g., border router A) determines which set of destination prefixes to protect with BGP Fast Convergence. At steps 615 and 620, the BGP node calculates the best and backup BGP paths for each protected destination prefix, such as, e.g., in accordance with the procedures in FIG. 7 or FIG. 8 described below. The best and backup BGP paths may be stored in the routing table 400 (e.g., at the routing layer) in step 625, as described above, and a best BGP path may be selected as a utilized path for each of the protected destination prefixes in step 630 (e.g., by RIB 245). When a failure of the best BGP path is detected at step 635, the BGP node may quickly select a backup BGP path as the utilized path for the protected destination prefix in step 640 accordingly, thus allowing for BGP Fast Convergence. The procedure 600 ends at step 645. Notably, the BGP node may continue to utilize the backup BGP path, or the network may reconverge, allowing for the recalculation of the best BGP path, as those skilled in the art will understand.

Figure 7:
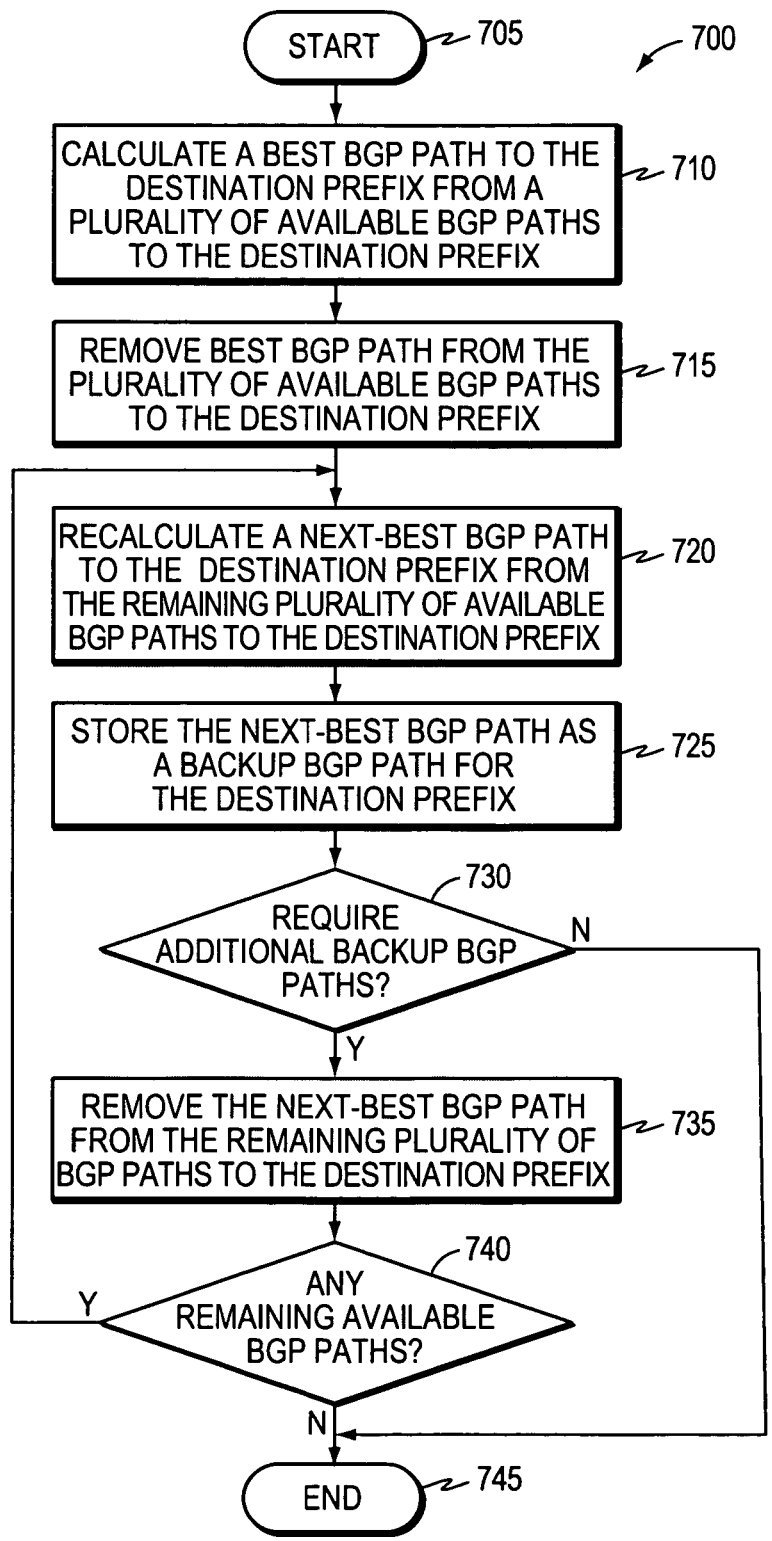
FIG. 7 is a flowchart illustrating a first procedure for calculating best and backup BGP paths for destination prefixes in accordance with the present invention.

FIG. 7 is a flowchart illustrating a first procedure for calculating best and backup BGP paths for destination prefixes in accordance with the present invention. The procedure 700 starts at step 705, and continues to step 710, where the BGP node calculates a best path to the destination prefix from a plurality of available BGP paths to the destination prefix, e.g., according to a best BGP path selection algorithm. Once the best BGP path is calculated, it is removed from the plurality of available BGP paths to the destination prefix in step 715. The next-best BGP path to the destination prefix may then be recalculated from the remaining plurality of available BGP paths to the destination prefix in step 720. If the BGP node is configured to require additional backup BGP paths in step 730, the next-best BGP path is removed from the remaining plurality of BGP paths to destination prefix in step 735, and if there are remaining available BGP paths at step 740, the procedure continues to step 720 where the BGP node recalculates next-best BGP paths and stores them as backup BGP paths in step 725. If, however, no additional backup BGP paths are required at step 730, or there are no remaining available BGP paths to recalculate a next-best BGP path at step 740, the procedure 700 ends at step 745 with a calculated best BGP path and at least one backup BGP path.

Figure 8:
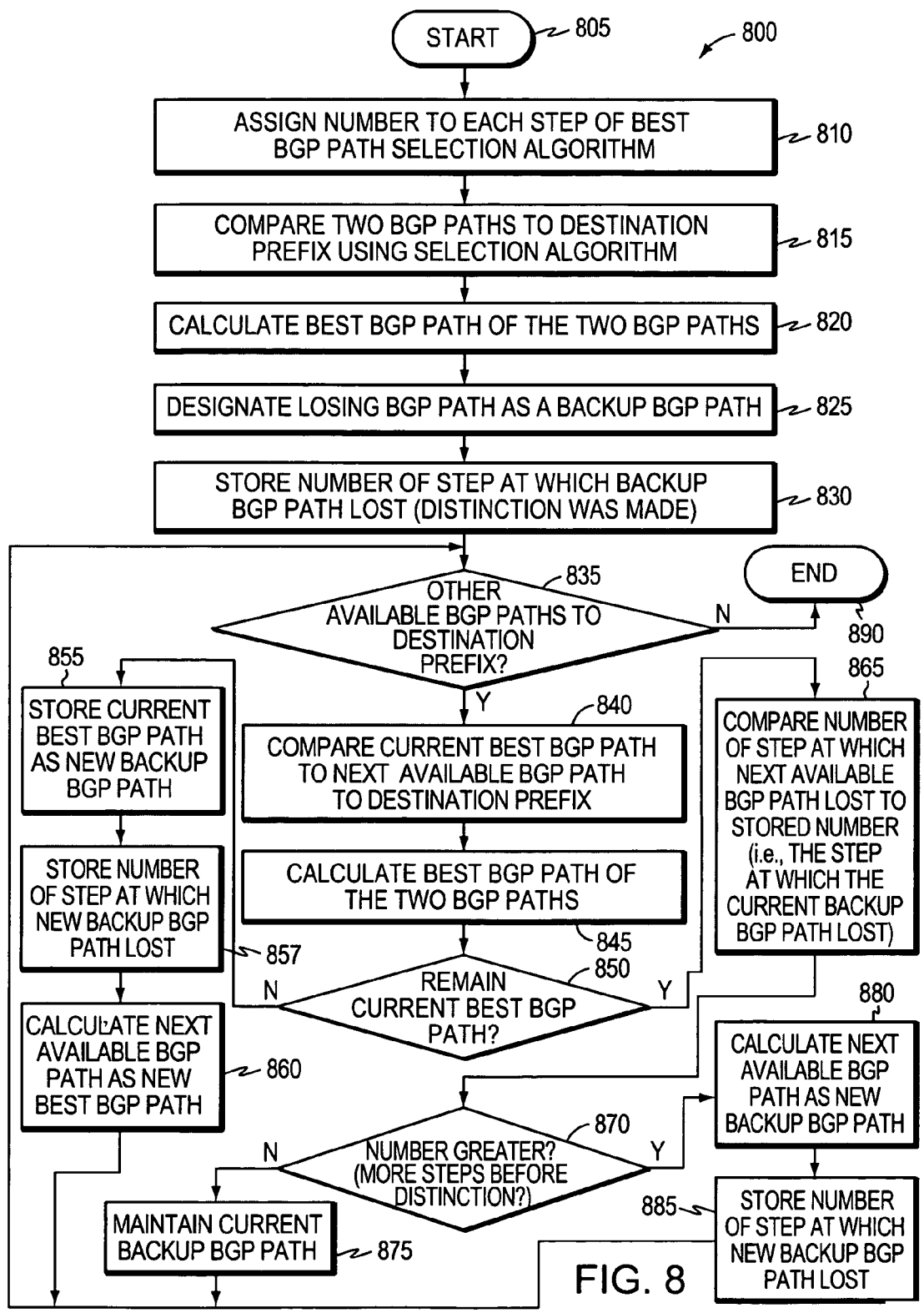
FIG. 8 is a flowchart illustrating an alternative procedure for calculating best and backup BGP paths for destination prefixes in accordance with the present invention.

FIG. 8 is a flowchart illustrating an alternative procedure for calculating best and backup BGP paths for destination prefixes in accordance with the present invention. The procedure 800 starts at step 805, and continues to step 810, where the BGP node assigns a number to each step of a best BGP path selection algorithm, such as described above. The selection algorithm compares two BGP paths to the destination prefix in step 815, and calculates the best BGP path of the two BGP paths in step 820. The losing BGP path (i.e., the non-best BGP path) may then be designated as a backup BGP path in step 825. Also, the number corresponding to the step at which the backup BGP path lost (i.e., the distinction was made) is stored at step 830.

If there are other available paths to the destination prefix in step 835 that have yet to be compared, the BGP node compares the current (selected) best BGP path with a next available BGP path to the destination prefix in step 840. The best BGP path of the two BGP paths (i.e., the current best BGP path and the next available BGP path) is calculated in step 845. If at step 850 the newly calculated best BGP path is not the previous (current) best BGP path, the current best BGP path is designated and stored as the new backup BGP path in step 855 (e.g., replacing the previous backup BGP path), and the step at which the new backup BGP path (i.e., the current best BGP path) lost is stored as the stored number in step 857. The next available BGP path is calculated (selected) as the new best BGP path in step 860.

If, on the other hand, the previous best BGP path remains the best BGP path in step 850 after the comparison, the BGP node compares the number corresponding to the step at which the next available BGP path lost with the stored number (i.e., the step at which the current backup BGP path lost) in step 865. (Notably, as mentioned above, the comparison of numbers is merely one example technique for examining the comparison progress within the selection algorithm.) If the number for the next available BGP path is not greater than the stored number (i.e., the current backup BGP path progressed through more steps of the selection algorithm prior to its distinction) at step 870, the current backup BGP path is maintained as such in step 875. If, however, the number for the next available BGP path is greater than the stored number (i.e., the next available BGP path progressed through more steps of the selection algorithm prior to its distinction) at step 870, the next available BGP path is calculated (selected) as the new backup BGP path (e.g., replacing the previous backup BGP path) in step 880, and the number corresponding to the step at which the new backup BGP path (i.e., the next available BGP path) lost is stored as the stored number in step 885.

The procedure 800 returns to step 835 where the BGP node compares next available BGP paths until no other BGP paths are available to the destination prefix, in which case the procedure ends at step 890. At this point, the BGP node has calculated a best BGP path and a "best" backup BGP path to the destination prefix. Notably, as mentioned above, additional backup paths may be calculated in a similar manner with simple modifications to the procedure 800. Moreover, those skilled in the art will understand that procedure 800 in FIG. 8 may offer a benefit over procedure 700 in FIG. 7 above by only traversing (comparing) the list of available BGP paths once, as opposed to each time an additional backup BGP path is required. (Those skilled in the art will understand the either procedure may result in the same best and backup BGP paths, accordingly.)

Advantageously, the novel technique institutes backup BGP paths for non-multipath BGP Fast Convergence in a computer network. By creating backup BGP paths, the novel technique allows for faster BGP convergence in response to best BGP path failure in non-multipath BGP networks. In particular, less traffic may be impacted (e.g., lost) due to a BGP path failure, where connectivity protection scales with regard to a number of diverse backup BGP paths. Also, the dynamic nature of the novel technique alleviates the need for cumbersome manual configuration.

While there has been shown and described an illustrative embodiment that institutes backup BGP paths for non-multipath BGP Fast Convergence in a computer network, it is to be understood that various other adaptations and modifications may be made within the spirit and scope of the present invention. For example, the invention has been shown and described herein using physical nodes and links. However, the invention in its broader sense is not so limited, and may, in fact, be used with virtual nodes and links (e.g., and virtual routing tables, etc.) as will be understood by those skilled in the art. Moreover, while the above description describes two backup BGP path selection techniques, the invention may also be advantageously used with other techniques used to selected backup BGP paths accordingly.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for instituting backup Border Gateway Protocol (BGP) paths for non-multipath BGP Fast Convergence in a computer network, the method comprising:
   calculating, by a processor, a best BGP path to a destination prefix from a plurality of available BGP paths to the destination prefix;
   removing the best BGP path from the plurality of available BGP paths to the destination prefix;
   recalculating a next-best BGP path to the destination prefix from the plurality of available BGP paths;
   storing the next-best BGP path as a backup BGP path for the destination prefix;
   selecting the best BGP path as a utilized path for the destination prefix;
   determining that the best BGP path has failed; and, in response
   selecting the backup BGP path as the utilized path for the destination prefix.

2. The method as claim 1, further comprising:
   calculating additional backup BGP paths by
   i) removing the next-best BGP path from the plurality of available BGP paths to the destination prefix,
   ii) recalculating a next-best BGP path to the destination prefix from the plurality of available BGP paths, and
   iii) storing the next-best BGP path as an additional backup BGP path for the destination prefix.

3. The method as claim 2, further comprising:
calculating additional backup BGP paths until the occurrence of one of a configurable number of additional backup paths has been calculated and determining that no available BGP paths remain for the destination prefix.

4. The method as claim 1, further comprising:
determining a set of all destination prefixes to protect; and instituting backup BGP paths for non-multipath BGP Fast Convergence for each destination prefix of the set.

5. The method as claim 1, further comprising:
determining that the best BGP path has failed in response to a connectivity verification protocol selected from a group comprising: Bidirectional Forwarding Detection (BFD), Interior Gateway Protocol (IGP) convergence, and BGP session connectivity detection.

6. The method as claim 1, further comprising:
requiring that the backup BGP path be diverse from the best BGP path.

7. The method as claim 6, further comprising:
requiring BGP next-hop node diversity.

8. The method as claim 1, further comprising:
storing the best and backup BGP path in a routing table.

9. The method as claim 8, further comprising:
including an indication designating the backup BGP path in the routing table.

10. The method as claim 8, further comprising:
storing the best and backup BGP path asynchronously.

11. A method for instituting backup Border Gateway Protocol (BGP) paths for non-multipath BGP Fast Convergence in a computer network, the method comprising:
comparing, by a processor, two BGP paths to a destination prefix based on a best BGP path selection algorithm;
calculating a best BGP path of the two BGP paths to produce a selected best BGP path;
calculating a backup BGP path as the BGP path of the two BGP paths other than the best BGP path to produce a selected backup BGP path;
comparing the selected best BGP path with a next available BGP path to the destination prefix;
recalculating a best BGP path from the selected best BGP path and the next available BGP path based on the selection algorithm to produce a new selected best BGP path;
selecting a finally-determined best BGP path as a utilized path for the destination prefix;
determining that the finally-determined best BGP path has failed; and, in response
selecting a finally-determined backup BGP path as the utilized path for the destination prefix.

12. The method as claim 11, further comprising:
in response to the next available BGP path being recalculated as the new selected best BGP path, recalculating the selected backup BGP path as the selected best BGP path to produce a new selected backup BGP path.

13. The method as claim 11, further comprising:
assigning a number to each step of the best BGP path selection algorithm; and
storing the number corresponding to the step of the selection algorithm at which the selected backup BGP path was calculated to produce a stored number.

14. The method as claim 13, further comprising:
in response to the selected best BGP path remaining as the new selected best BGP path,
i) comparing a number corresponding to the step of the selection algorithm at which the new selected best BGP path was recalculated with the stored number, and
ii) in response to the number corresponding to the step of the selection algorithm at which the new selected best BGP path was recalculated being greater than the stored number, a) recalculating the selected backup BGP path as the next available BGP path, and b) storing the number corresponding to the step of the selection algorithm at which the new selected best BGP path was recalculated as the stored number.

15. The method as claim 11, further comprising:
in response to the selected best BGP path remaining as the new selected best BGP path,
i) comparing a step of the selection algorithm at which the new selected best BGP path was recalculated with a step of the selection algorithm at which the selected backup BGP path was calculated, and
ii) in response to the step of the selection algorithm at which the new selected best BGP path was recalculated being further along the selection algorithm than the step of the selection algorithm at which the selected backup BGP path was calculated, recalculating the selected backup BGP path as the next available BGP path.

16. The method as claim 11, further comprising:
recalculating the best BGP path until no next available BGP paths remain for the destination prefix.

17. An apparatus for instituting backup Border Gateway Protocol (BGP) paths for non-multipath BGP Fast Convergence in a computer network, the apparatus comprising:
means for calculating a best BGP path to a destination prefix from a plurality of available BGP paths to the destination prefix and for removing the best BGP path from the plurality of available BGP paths to the destination prefix;
means for calculating one or more backup BGP paths to the destination prefix by recalculating one or more next-best BGP paths to the destination prefix from the plurality of available BGP paths;
means for storing the one or more next-best BGP paths as backup BGP paths for the destination prefix;
means for selecting the best path as a utilized path for the destination prefix;
means for determining that the best BGP path has failed; and
means for selecting one of the backup BGP paths as the utilized path for the destination prefix, in response to determination that the best BGP path has failed.

18. A computer readable medium containing executable program instructions for instituting backup Border Gateway Protocol (BGP) paths for non-multipath BGP Fast Convergence in a computer network, the executable program instructions comprising program instructions for:
calculating a best BGP path to a destination prefix from a plurality of available BGP paths to the destination prefix;
removing the best BGP path from the plurality of available BGP paths to the destination prefix;
calculating one or more backup BGP paths to the destination prefix by recalculating one or more next-best BGP paths to the destination prefix from the plurality of available BGP paths;
storing the one or more next-best BGP paths as backup BGP paths for the destination prefix;
selecting the best path as a utilized path for the destination prefix;
determining that the best BGP path has failed; and, in response
selecting one of the backup BGP paths as the utilized path for the destination prefix.

19. A node comprising:
one or more network interfaces;
a processor coupled to the one or more network interfaces and configured to execute software processes; and
a memory configured to store a BGP Fast Convergence process executable by the processor, the BGP Fast Convergence process configured to: calculate a best BGP path to a destination prefix, remove the best BGP path to the destination prefix from a plurality of available BGP paths to the destination prefix, calculate one or more backup BGP paths to the destination prefix by calculation of a next-best BGP path to the destination prefix from the plurality of available BGP paths after the best BGP path was removed, select the best path as a utilized path for the destination prefix, determine that the best BGP path has failed, and, in response, select one of the backup BGP paths as the utilized path for the destination prefix.

20. The node as claim 19, wherein the BGP Fast Convergence process is further configured to determine that the best BGP path has failed in response to a connectivity verification protocol selected from a group comprising: Bidirectional Forwarding Detection (BFD), Interior Gateway Protocol (IGP) convergence, and BGP session connectivity detection.

21. The node as claim 19, wherein the BGP Fast Convergence process is further configured to calculate an additional backup BGP path by removal of the next-best BGP path from the plurality of available BGP paths to the destination prefix and recalculation of an other next-best BGP path to the destination prefix from the plurality of available BGP paths.

22. The node as claim 19, wherein the BGP Fast Convergence process is further configured to require that the one or more backup BGP paths be diverse from the best BGP path.

23. A node comprising:
one or more network interfaces;
a processor coupled to the one or more network interfaces and configured to execute software processes; and
a memory configured to store a BGP Fast Convergence process executable by the processor, the BGP Fast Convergence process configured to: compare two BGP paths to a destination prefix based on a best BGP path selection algorithm, calculate a best BGP path of the two BGP paths to produce a selected best BGP path, calculate a backup BGP path as the BGP path of the two BGP paths other than the best BGP path, compare the selected best BGP path with a next available BGP path to the destination prefix, recalculate a best BGP path from the selected best BGP path and the next available BGP path based on the selection algorithm, select a finally-determined best BGP path as a utilized path for the destination prefix, determine that the finally-determined best BGP path has failed; and, in response select a finally-determined backup BGP path as the utilized path for the destination prefix.

24. The node as claim 23, wherein the BGP Fast Convergence process is further configured to, in response to the next available BGP path being recalculated as the new selected best BGP path, recalculate the selected backup BGP path as the selected best BGP path to produce a new selected backup BGP path.

25. The node as claim 23, wherein the best BGP path selection algorithm includes a plurality of ordered steps and the BGP Fast Convergence process is further configured to store an indication of a step in the plurality of ordered steps at which the selected backup BGP path was calculated.

26. The node as claim 25, wherein the BGP Fast Convergence process is further configured to compare an indication of a step in the plurality of ordered steps at which the new selected best BGP path was recalculated with the stored indication of the step in the plurality of ordered steps at which the selected backup BGP path was calculated, and in response to the step in the plurality of ordered steps at which the new selected best BGP path was recalculated being prior to the step in the plurality of ordered steps at which the selected backup BGP path was calculated, recalculate the selected backup BGP path as the next available BGP path.

\* \* \* \* \*

UNITED STATES PATENT AND TRADEMARK OFFICE
CERTIFICATE OF CORRECTION

| | | |
|---|---|---|
| PATENT NO. | : 7,813,265 B2 | Page 1 of 1 |
| APPLICATION NO. | : 11/371522 | |
| DATED | : October 12, 2010 | |
| INVENTOR(S) | : Keyur P. Patel | |

It is certified that error appears in the above-identified patent and that said Letters Patent is hereby corrected as shown below:

Col. 17, Line 29, please replace "an other" with --another--

Signed and Sealed this
Seventeenth Day of May, 2011

David J. Kappos
*Director of the United States Patent and Trademark Office*